United States Patent
Sugita

(10) Patent No.: US 11,681,401 B2
(45) Date of Patent: Jun. 20, 2023

(54) TOUCH PANEL FOR DETECTING A CONTACT USING A DIFFERENCE OF DETECTION PERIODS

(71) Applicant: SHARP KABUSHIKI KAISHA, Sakai (JP)

(72) Inventor: Yasuhiro Sugita, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/357,204

(22) Filed: Jun. 24, 2021

(65) Prior Publication Data
US 2022/0011906 A1  Jan. 13, 2022

(30) Foreign Application Priority Data
Jul. 7, 2020 (JP) .............................. JP2020-116982

(51) Int. Cl.
| | | |
|---|---|---|
| *G06F 3/044* | (2006.01) | |
| *G02F 1/1333* | (2006.01) | |
| *G06F 3/041* | (2006.01) | |
| *G02F 1/1335* | (2006.01) | |
| *G02F 1/13357* | (2006.01) | |

(52) U.S. Cl.
CPC ........ *G06F 3/0445* (2019.05); *G02F 1/13338* (2013.01); *G02F 1/133512* (2013.01); *G02F 1/133514* (2013.01); *G02F 1/133605* (2013.01); *G06F 3/0416* (2013.01)

(58) Field of Classification Search
CPC .. G06F 3/0445; G06F 3/0416; G02F 1/13338; G02F 1/033514; G02F 1/133605
See application file for complete search history.

(56) References Cited

U.S. PATENT DOCUMENTS

| | | | | |
|---|---|---|---|---|
| 2010/0292945 A1* | 11/2010 | Reynolds | .............. | G06F 3/0446 |
| | | | | 702/65 |
| 2014/0092055 A1* | 4/2014 | Radivojevic | ............ | G06F 3/016 |
| | | | | 345/174 |
| 2014/0253498 A1* | 9/2014 | Suzuki | .................. | G06F 3/0445 |
| | | | | 345/174 |
| 2016/0357278 A1* | 12/2016 | Qu | .................... | G02F 1/133512 |
| 2018/0143711 A1 | 5/2018 | Ono | | |
| 2019/0163314 A1* | 5/2019 | Kim | ...................... | G06F 3/0416 |

FOREIGN PATENT DOCUMENTS

JP        2017027224 A        2/2017

* cited by examiner

*Primary Examiner* — Sanghyuk Park
(74) *Attorney, Agent, or Firm* — ScienBiziP, P.C.

(57) ABSTRACT

A touch panel includes: a first substrate including a first touch electrode and a contact surface that can be touched by an object to be detected; a second substrate opposite the first substrate, the second substrate including a second touch electrode; a liquid crystal layer between the first substrate and the second substrate; and a control unit connected to the first touch electrode and the second touch electrode, wherein the control unit detects a first electrostatic capacity of the first touch electrode and a second electrostatic capacity between the first touch electrode and the second touch electrode, the first electrostatic capacity being changed by the object to be detected.

7 Claims, 4 Drawing Sheets

TOUCH PANEL FOR DETECTING A CONTACT USING A DIFFERENCE OF DETECTION PERIODS

CROSS-REFERENCE TO RELATED APPLICATION

The present application claims priority from Japanese Application JP2020-116982, the content to which is hereby incorporated by reference into this application.

BACKGROUND OF THE INVENTION

1. Field of the Invention

The present invention relates to touch panels.

2. Description of the Related Art

As an example, Japanese Unexamined Patent Application Publication, Tokukai, No. 2017-27224 discloses an "in-cell" touch panel, or a display panel that functions also as a touch panel. A touch panel described in Japanese Unexamined Patent Application Publication, Tokukai, No. 2017-27224 includes touch sensor electrodes on a first substrate provided on a contact surface side of the touch panel, so that an object to be detected such as a finger can touch the contact surface. The touch panel is hence capable of detecting a touch position from changes in the electrostatic capacity formed between the object and the touch sensor electrodes.

SUMMARY OF THE INVENTION

Since changes in electrostatic capacity are detected, for example, between the object to be detected and the touch sensor electrodes, it is in some cases difficult to detect a contact made on the contact surface by an object, in other words, to detect pressure and depression load, with the touch panel of Japanese Unexamined Patent Application Publication, Tokukai, No. 2017-27224.

The present disclosure has a primary object to provide a touch panel capable of more precisely detecting a contact made on a contact surface by an object to be detected, pressure on the contact surface, and/or depression load on the contact surface.

Solution to the Problems

The present invention, in an aspect thereof, is directed to a touch panel including: a first substrate including a first touch electrode and a contact surface that can be touched by an object to be detected; a second substrate opposite the first substrate, the second substrate including a second touch electrode; a liquid crystal layer between the first substrate and the second substrate; and a control unit connected to the first touch electrode and the second touch electrode, wherein the control unit detects a first electrostatic capacity of the first touch electrode and a second electrostatic capacity between the first touch electrode and the second touch electrode, the first electrostatic capacity being changed by the object to be detected.

DESCRIPTION OF EMBODIMENTS

The following will describe an exemplary preferred embodiment of the present invention. The following embodiment is merely illustrative and by no means limits the present invention.

Figure 1:
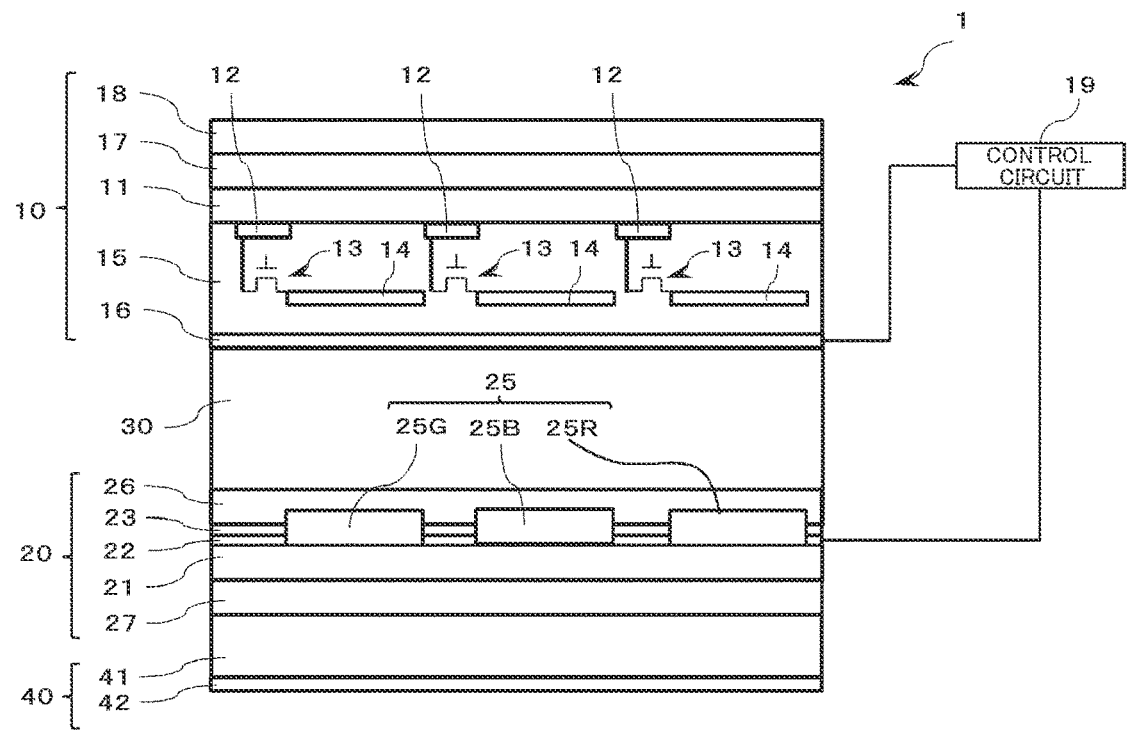
FIG. 1 is a schematic cross-sectional view of an exemplary touch panel in accordance with an embodiment.
Figure 2:
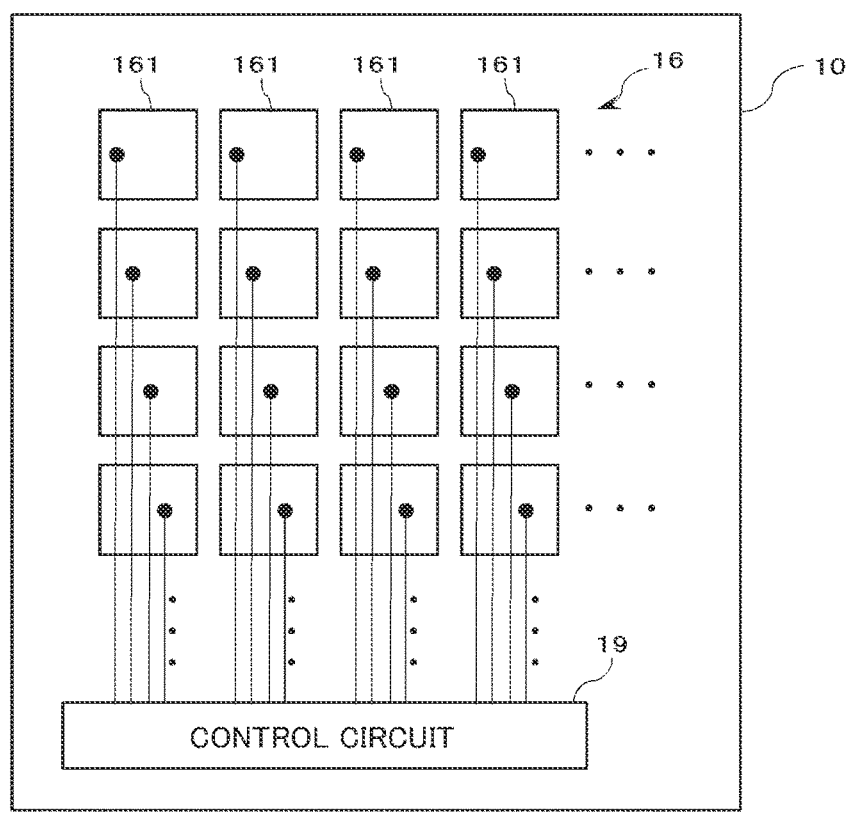
FIG. 2 is a schematic view of an example of the TFT substrate shown in FIG. 1.
Figure 3:
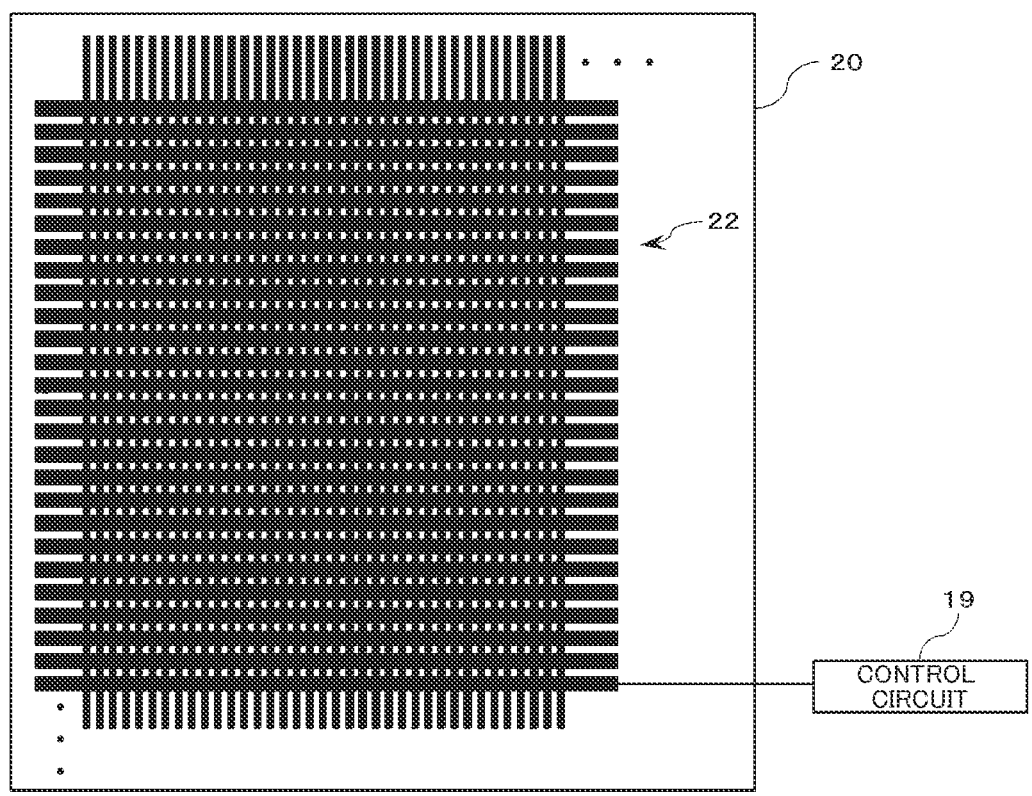
FIG. 3 is a schematic view of an example of the CF substrate shown in FIG. 1.

A description is now given of an exemplary touch panel 1 in accordance with the present embodiment with reference to FIGS. 1 to 3. FIG. 1 is a schematic cross-sectional view of the touch panel 1 in accordance with the present embodiment. Since FIG. 1 is schematic, hatching and other drawing symbols are omitted.

The touch panel 1 includes, among others, a TFT substrate (first substrate) 10, a CF substrate (second substrate) 20 opposite the TFT substrate 10, a liquid crystal layer 30 between the TFT substrate 10 and the CF substrate 20, and a backlight unit 40 on the back of the CF substrate 20 (the opposite side thereof from the liquid crystal layer 30). Light from the backlight unit 40 travels through the CF substrate 20, the liquid crystal layer 30, and the TFT substrate 10 to produce a display on the touch panel 1. The liquid crystal layer 30 is a layer of liquid crystal enclosed between the TFT substrate 10 and the CF substrate 20, for example, in the display area of the touch panel 1.

The TFT substrate 10 includes, for example, a transparent glass substrate 11, source lines 12, gate lines (not shown), thin film transistors (TFTs) 13, pixel electrodes 14, an insulation layer 15, and a first touch electrode 16. The source lines 12, the gate lines (not shown), the thin film transistors (TFTs) 13, the pixel electrodes 14, the insulation layer 15, and the first touch electrode 16, which also serves as a common electrode in producing a display, are provided on the side of the glass substrate 11 that faces the liquid crystal layer 30. A protective film may be provided on the first touch electrode 16.

On the TFT substrate 10 is there provided a control circuit 19, for example, for producing a display on the touch panel 1 and detecting an object. The control circuit 19 is disposed, for example, on a portion of the TFT substrate 10 that corresponds to a non-display area of the touch panel 1. The TFT substrate 10 is made by, for example, COG (Chip-On-Glass) or COF (Chip-On-Film) technology.

The source lines 12 are electrically connected to the source electrodes of the TFTs 13 and also to the control circuit 19 via, for example, switches.

The gate lines are electrically connected to the gate electrodes of the TFTs 13 and also to the control circuit 19 via, for example, switches.

The pixel electrodes 14 are electrically connected to the drain electrodes of the TFTs 13.

The first touch electrode 16 includes a matrix of segment electrodes 161, for example, as shown in FIG. 2. The segment electrodes 161 are, for example, rectangular and disposed at 4 mm intervals. The segment electrodes 161 are electrically connected to the control circuit 19. In the present embodiment, the first touch electrode 16 doubles as a common electrode for driving the liquid crystal.

The TFT substrate 10 further includes, for example, a polarizer 17 and a glass cover 18. The polarizer 17 and the glass cover 18 are provided on the opposite side of the glass substrate 11 from the liquid crystal layer 30. The glass cover 18 serves as the display screen for the touch panel 1 and also as a contact surface that can be touched by an object to be detected such as a finger.

The CF substrate 20 includes among others, a transparent glass substrate 21, a second touch electrode 22 on the glass substrate 21, a color filter (CF) 25 including a black matrix 23, and an overcoat layer 26 covering these elements. There is also provided, for example, a polarizer 27 on the opposite side of the glass substrate 21 from the color filter 25.

The color filter 25 includes, for example, a red color filter 25R, a green color filter 25Q and a blue color filter 25B. The black matrix 23 is provided, for example, around the color filters 25R, 25Q and 25B so as to isolate the color filters 25R, 25Q and 25B. The black matrix 23 may have a different structure. For example, the black matrix 23 may be provided in another layer with openings over the RGB color filters 25R, 25Q and 25B in a plan view.

The second touch electrode 22, for example, has a similar shape to the black matrix 23 and is provided between the black matrix 23 and the glass substrate 21 so as to overlap the black matrix 23. The second touch electrode 22 is provided, for example, as a single piece in the CF substrate 20 without being divided into a plurality of electrodes. The second touch electrode 22 is made of, for example, a light-reflecting metal such as aluminum and doubles as a reflective metal layer. To put it another way, the second touch electrode 22 is a reflective electrode. This dual function of the reflective metal layer as the second touch electrode can reduce the manufacturing cost of the touch panel 1.

The black matrix 23 may alternatively be composed of a light-shielding conductive material so that the black matrix 23 can double as the second touch electrode. As another alternative, the reflective metal layer and the black matrix may be combined to serve as the second touch electrode. The second touch electrode 22 is electrically connected to, for example, the control circuit 19. The second touch electrode 22 is electrically connected to the control circuit 19, for example, through conductive beads interposed between the CF substrate 20 and the TFT substrate 10 (e.g., inside the sealing) in the non-display area of the touch panel 1.

The backlight unit 40 includes, for example: an illumination unit 41 that is a light source built around LEDs; and a reflection unit 42 that reflects light coming from the illumination unit 41 toward the CF substrate 20, the liquid crystal layer 30, and the TFT substrate 10. Since the CF substrate 20 includes a reflective metal layer in the touch panel 1 in accordance with the present embodiment, the light coming from the illumination unit 41 is reflected by the reflection unit 42 and the reflective metal layer. The structure thus improves the luminance of the touch panel 1.

The description above has focused on a single pixel in the touch panel 1. The touch panel 1 however includes, for example, a matrix of pixels.

Figure 4:
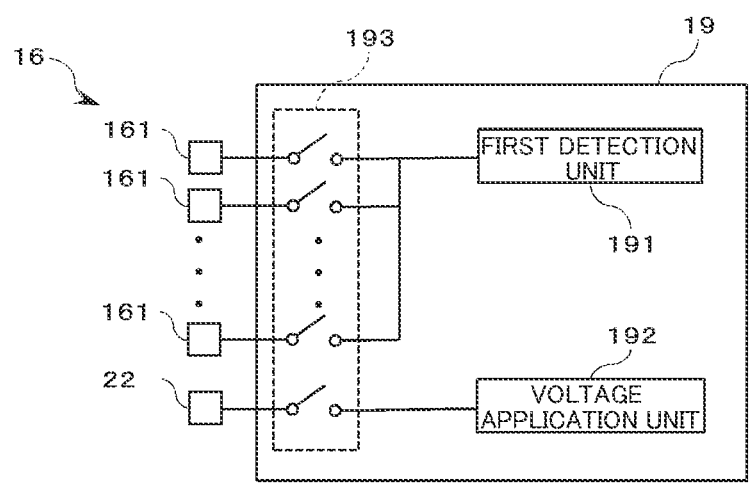
FIG. 4 is a diagram of an exemplary structure of a control circuit.

A more detailed description is now given of an example of the control circuit (control unit) 19. The control circuit 19 includes, for example, a first detection unit 191, a voltage application unit 192, and a switch unit 193 as shown in FIG. 4.

The first detection unit 191, for example, applies a prescribed voltage to the first touch electrode 16 via the switch unit 193 to detect a first electrostatic capacity of the first touch electrode 16. More specifically, the first detection unit 191 detects the first electrostatic capacity of a prescribed one of the segment electrodes 161 that is selected by the control circuit 19 controlling the switch unit 193. In other words, the first detection unit 191 is capable of detecting a contact made by an approaching object to be detected.

The voltage application unit 192, for example, applies a prescribed voltage to the second touch electrode 22 via the switch unit 193. The first detection unit 191 then detects a second electrostatic capacity formed between the first touch electrode 16 and the second touch electrode 22. More specifically, the first detection unit 191 detects the second electrostatic capacity formed between the second touch electrode 22 and a prescribed one of the segment electrodes 161 that is selected by the control circuit 19 controlling the switch unit 193. In other words, the first detection unit 191 is capable of detecting a motion of the first touch electrode toward the liquid crystal layer 30 that is caused by the object to be detected depressing the contact surface, that is, the pressure exerted to the contact surface by the object to be detected. In this example, the switch unit 193 is used to control voltage application. Alternatively, the first detection unit 191 and the voltage application unit 192 may individually control, for example, the timings of voltage application.

The control circuit 19 then determines a touch made by the object to be detected and a touch position from, for example, the first electrostatic capacity, the second electrostatic capacity, the location of the segment electrode 161 where the first electrostatic capacity is detected, and the location of the segment electrode 161 where the second electrostatic capacity is detected. This manner of the first detection unit 191 detecting a contact (approaching) of the object to be detected and detecting the pressure exerted by the object to be detected enables more precise and more sensitive sensing of the contact location and the pressure exerted by the object to be detected on the contact surface. The touch panel 1, as an example, is therefore applicable to, for example, a full flat surface keyboard.

The touch panel 1 is driven in, for example, touch detection mode for detecting an object. The touch panel 1, for example, cyclically repeats switching between a display period (DP period) and a touch detection period (TS period) in touch detection mode, to toggle between a display operation and a touch detection operation. The driving frequency for these periods may be designed in a suitable manner. As an example, a display period (e.g., one vertical period) for one image display may be divided in two subperiods to introduce a touch detection period between the subperiods. As another example, two touch detections may be performed for each image display where, for example, the display period is set to 60 Hz and the touch detection period is set to 120 Hz, or two times 60 Hz.

The touch detection period includes, for example, a first-touch detection period for detecting the first electrostatic capacity and a second-touch detection period for detecting the second electrostatic capacity. In other words, the touch panel 1 is driven in touch detection mode in which the first electrostatic capacity is detected in the first-touch detection period and the second electrostatic capacity is detected in the second-touch detection period. In other words, the touch panel 1 detects a contact (approaching) of an object to be detected in the first-touch detection period and detects the pressure exerted by the object to be detected in the second-touch detection period. The first-touch detection period and the second-touch detection period may be provided separately in the same touch detection period or provided in different touch detection periods. The touch panel 1 may be driven in display mode in which only a display is produced without detecting a touch.

Figure 5:
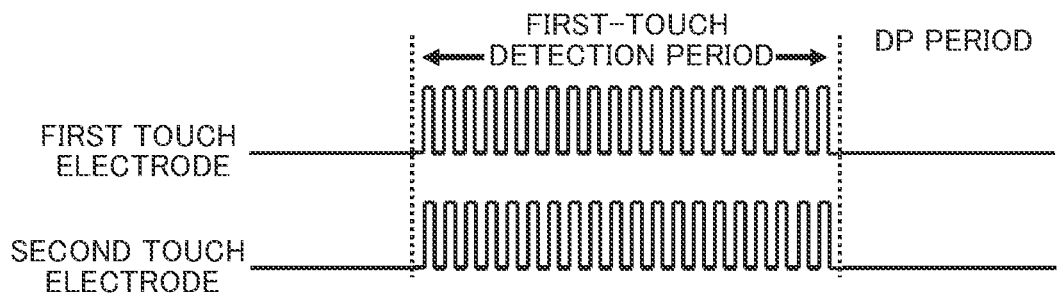
FIG. 5 is a diagram of an exemplary voltage applied in a first-touch detection period.

FIG. 5 is a diagram of an exemplary voltage that the control circuit 19 applies to the first touch electrode 16 and the second touch electrode 22 in the first-touch detection period.

In FIG. 5, the first detection unit 191 applies a first pulse voltage having a prescribed waveform to the first touch electrode 16. The first detection unit 191 can hence detect the first electrostatic capacity in the first-touch detection period, thereby detecting an object to be detected.

In addition, in FIG. 5, the voltage application unit 192 applies the first pulse voltage to the second touch electrode 22. Therefore, no voltage develops across the first touch electrode 16 and the second touch electrode 22, which cancels out the influence of the second touch electrode 22 on the first electrostatic capacity. The first detection unit 191 can hence more accurately detect the first electrostatic capacity of the first touch electrode 16, thereby more precisely detecting an object to be detected.

Figure 6:
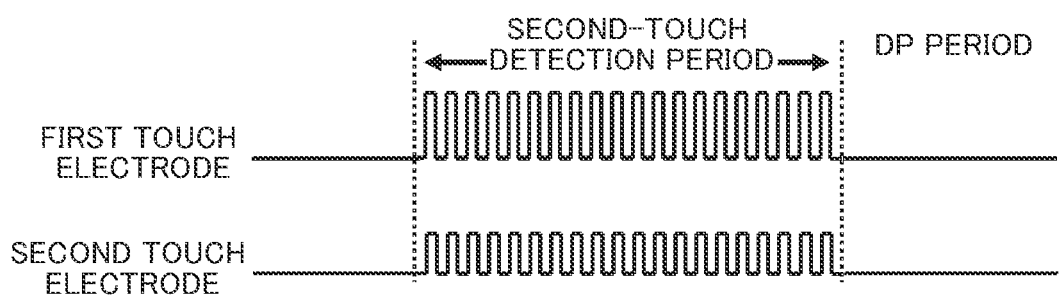
FIG. 6 is a diagram of an exemplary voltage applied in a second-touch detection period.

FIG. 6 is a diagram of an exemplary voltage that the control circuit 19 applies to the first touch electrode 16 and the second touch electrode 22 in the second-touch detection period.

Referring to FIG. 6, the first detection unit 191 applies to the first touch electrode 16 a second pulse voltage that is, for example, identical to the first pulse voltage. Meanwhile, the voltage application unit 192 applies to the second touch electrode 22, a third pulse voltage that has, for example, the same polarity and timings as the pulse voltage applied to the first touch electrode, but that has a smaller amplitude than the pulse voltage. The first detection unit 191 can hence detect the second electrostatic capacity in the second-touch detection period, thereby detecting the pressure exerted by the object to be detected. The second pulse voltage is identical to the first pulse voltage in this example, but not necessarily so.

The first detection unit 191 may take a differential between a signal related to the second electrostatic capacity detected in the second-touch detection period and a signal related to the first electrostatic capacity detected in the first-touch detection period, especially when the first pulse voltage is identical to the second pulse voltage. By taking such a differential, the first detection unit 191 can cancel out the influence related to the contact (approaching) of the object to be detected, thereby more precisely detecting the pressure (change in the capacity caused by a change in the distance between the first touch electrode 16 and the second touch electrode 22, in other words, the second electrostatic capacity alone).

Figure 7:
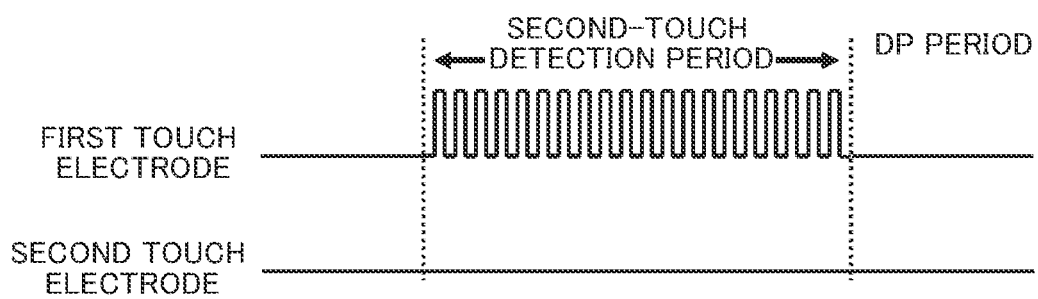
FIG. 7 is a diagram of another exemplary voltage applied in a second-touch detection period.

FIG. 7 is a diagram of another exemplary voltage that the control circuit 19 applies to the first touch electrode 16 and the second touch electrode 22 in the second-touch detection period.

Referring to FIG. 7, the first detection unit 191 applies, for example, the second pulse voltage that is identical to the first pulse voltage to the first touch electrode 16 and a constant voltage to the second touch electrode 22. The first detection unit 191 can hence detect the second electrostatic capacity in the second-touch detection period, thereby detecting the pressure exerted by the object to be detected. The second pulse voltage is identical to the first pulse voltage in this example, but not necessarily so.

The first detection unit 191 may take a differential between a signal related to the second electrostatic capacity detected in the second-touch detection period and a signal related to the first electrostatic capacity detected in the first-touch detection period, especially when the first pulse voltage is identical to the second pulse voltage. By taking such a differential, the first detection unit 191 can cancel out the influence related to the contact (approaching) of the object to be detected, thereby more precisely detecting the pressure (change in the capacity caused by a change in the distance between the first touch electrode 16 and the second touch electrode 22, in other words, the second electrostatic capacity alone).

Figure 8:
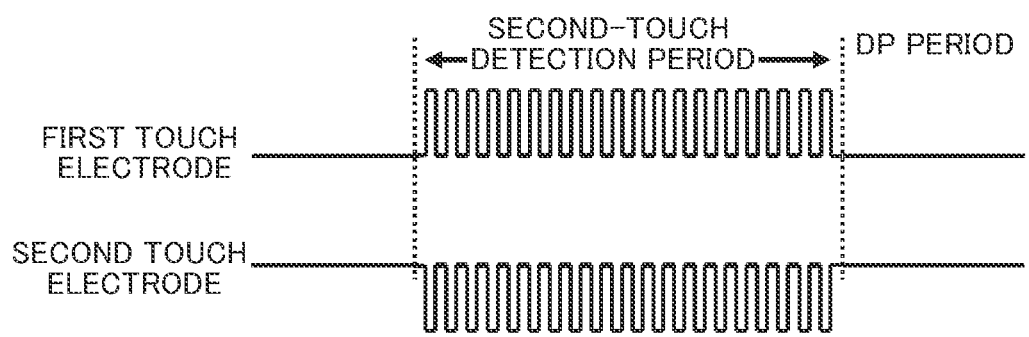
FIG. 8 is a diagram of yet another exemplary voltage applied in a second-touch detection period.

FIG. 8 is a diagram of yet another exemplary voltage that the control circuit 19 applies to the first touch electrode 16 and the second touch electrode 22 in the second-touch detection period.

Referring to FIG. 8, the first detection unit 191 applies, for example, the second pulse voltage to the first touch electrode 16. Meanwhile, the voltage application unit 192 applies to the second touch electrode 22 a fourth pulse voltage that has an opposite polarity to the second pulse voltage. The first detection unit 191 can hence detect the second electrostatic capacity in the second-touch detection period, thereby detecting the pressure exerted by the object to be detected. In addition, the voltage across the first touch electrode 16 and the second touch electrode 22 is practically doubled when compared with a case where the second pulse voltage is applied to the first touch electrode 16 and a constant voltage is applied to the second touch electrode 22. That can improve sensitivity in sensing the object to be detected with the first detection unit 191.

The first detection unit 191 may take a differential between a signal related to the second electrostatic capacity detected in the second-touch detection period and a signal related to the first electrostatic capacity detected in the first-touch detection period, especially when the first pulse voltage is identical to the second pulse voltage. By taking such a differential, the first detection unit 191 can cancel out the influence related to the contact (approaching) of the object to be detected, thereby more precisely detecting the pressure (change in the capacity caused by a change in the distance between the first touch electrode 16 and the second touch electrode 17, in other words, the second electrostatic capacity alone).

Figure 9:
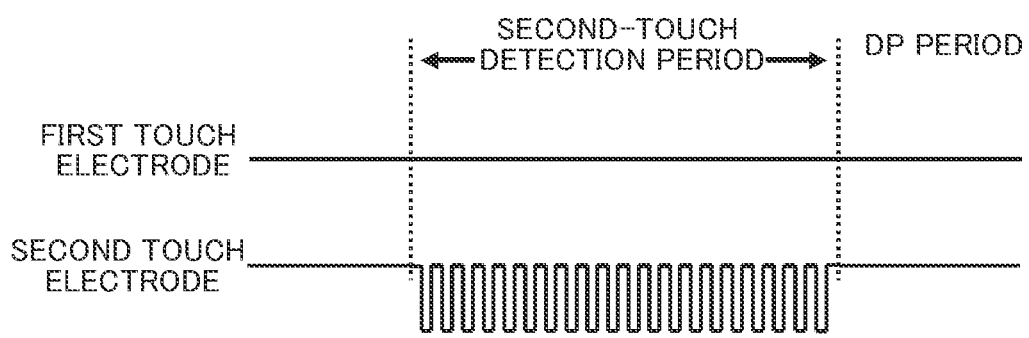
FIG. 9 is a diagram of still another exemplary voltage applied in a second-touch detection period.

FIG. 9 is a diagram of still another exemplary voltage that the control circuit 19 applies to the first touch electrode 16 and the second touch electrode 22 in the second-touch detection period.

Referring to FIG. 9, the first detection unit 191, for example, maintains the first touch electrode 16 at a constant voltage. Meanwhile, the voltage application unit 192 applies to the second touch electrode 22 a fifth pulse voltage that has an opposite polarity to the first pulse voltage. The first detection unit 191 can hence detect the second electrostatic capacity in the second-touch detection period, thereby detecting the pressure exerted by the object to be detected. Maintaining the first touch electrode 16 at a constant voltage as described here suppresses the influence related to the contact (approaching) of the object to be detected that is detected by the first detection unit 191, thereby detecting a signal representing only the pressure. This configuration obviates the need for a differential operation of subtracting a touch signal related to the first electrostatic capacity from a pressure signal related to the second electrostatic capacity to cancel out the influence related to the contact (approaching) of the object to be detected that is detected in the first-touch detection period.

The touch panel 1 in accordance with the present embodiment is assumed to be of a self-capacitance type where an object is detected based on the electrostatic capacity formed between the object and the first touch electrode 16, which is for illustrative purposes only. As another example, the touch panel 1 may be of a mutual-capacitance type where an object is detected based on the mutual electrostatic capacity formed between adjacent segment electrodes 161 in the first touch electrode 16 when the object approaches the touch panel 1. Alternatively, the touch panel 1 may be a combination of a self-capacitance type and a mutual-capacitance type.

The present invention is not limited to the description of the embodiments and examples above. Any structure detailed in the embodiments may be replaced by a practically identical structure, a structure that achieves the same effect and function, or a structure that achieves the same purpose.

What is claimed is:

1. A touch panel comprising:
   a first substrate including a first touch electrode and a touchable contact surface;
   a second substrate opposite the first substrate, the second substrate including a second touch electrode;
   a liquid crystal layer between the first substrate and the second substrate; and
   a control unit connected to the first touch electrode and the second touch electrode, wherein the control unit
   detects a first electrostatic capacity and a second electrostatic capacity, the first electrostatic capacity being a capacity of the first touch electrode and not related to the second touch electrode, the second electrostatic capacity being a capacity between the first touch electrode and the second touch electrode, and the first electrostatic capacity being changed when the contact surface is touched,
   drives in a touch detection mode in which the first electrostatic capacity is detected in a first-touch detection period and the second electrostatic capacity is detected in a second-touch detection period,
   applies a first pulse voltage to the first touch electrode in the first-touch detection period,
   applies a second pulse voltage to the first touch electrode in the second-touch detection period, and
   takes a differential between a signal related to the first electrostatic capacity detected in the first-touch detection period and a signal related to the second electrostatic capacity detected in the second-touch detection period when the first pulse voltage is identical to the second pulse voltage.

2. The touch panel according to claim 1, wherein the control unit further applies the first pulse voltage to the first touch electrode and the second touch electrode in the first-touch detection period to detect the first electrostatic capacity.

3. The touch panel according to claim 1, wherein the control unit further applies the second pulse voltage to the first touch electrode and a third pulse voltage to the second touch electrode in the second-touch detection period to detect the second electrostatic capacity, the second pulse voltage having a polarity identical to the first pulse voltage, the third pulse voltage being lower than the first pulse voltage and having a polarity identical to the first pulse voltage.

4. The touch panel according to claim 1, wherein the control unit further applies the second pulse voltage to the first touch electrode and a constant voltage to the second touch electrode in the second-touch detection period to detect the second electrostatic capacity, the second pulse voltage having a polarity identical to the first pulse voltage.

5. The touch panel according to claim 1, wherein the control unit further applies the second pulse voltage to the first touch electrode and a fourth pulse voltage to the second touch electrode in the second-touch detection period to detect the second electrostatic capacity, the second pulse voltage having a polarity identical to the first pulse voltage, the fourth pulse voltage having a polarity opposite to the first pulse voltage.

6. The touch panel according to claim 1, wherein the control unit further applies a constant voltage to the first touch electrode and a fifth pulse voltage to the second touch electrode in the second-touch detection period to detect the second electrostatic capacity, the fifth pulse voltage having a polarity opposite to the first pulse voltage.

7. The touch panel according to claim 1, further comprising a backlight unit on a side of the second substrate opposite from the liquid crystal layer, the backlight including: an illumination unit that shines light toward the second substrate; and a reflection unit that reflects the light from the illumination unit toward the second substrate, wherein
   the second substrate includes a color filter having a black matrix, and
   the second touch electrode is a reflective metal layer comprising a metal provided in the black matrix.

* * * * *